UNITED STATES PATENT OFFICE.

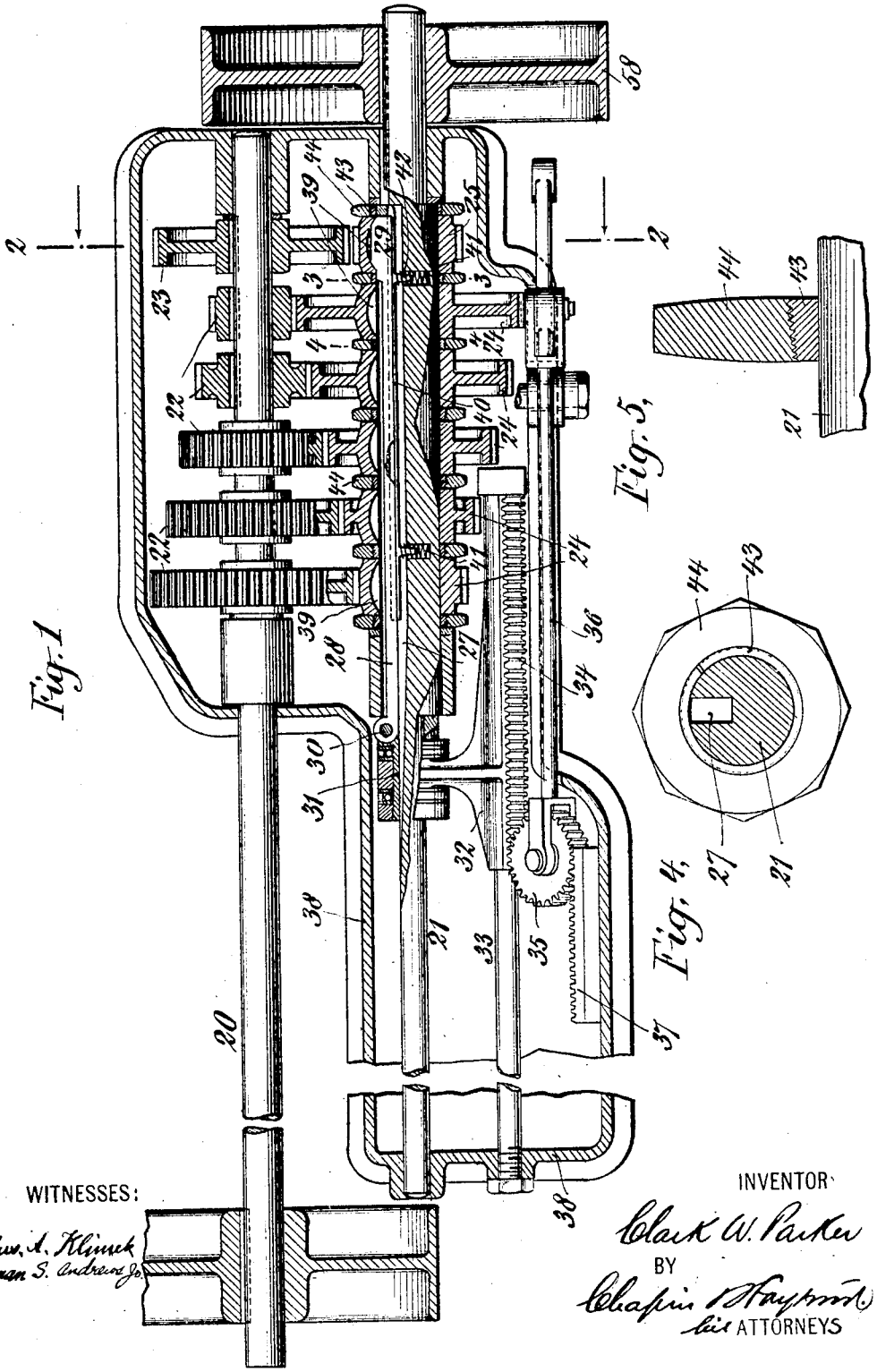

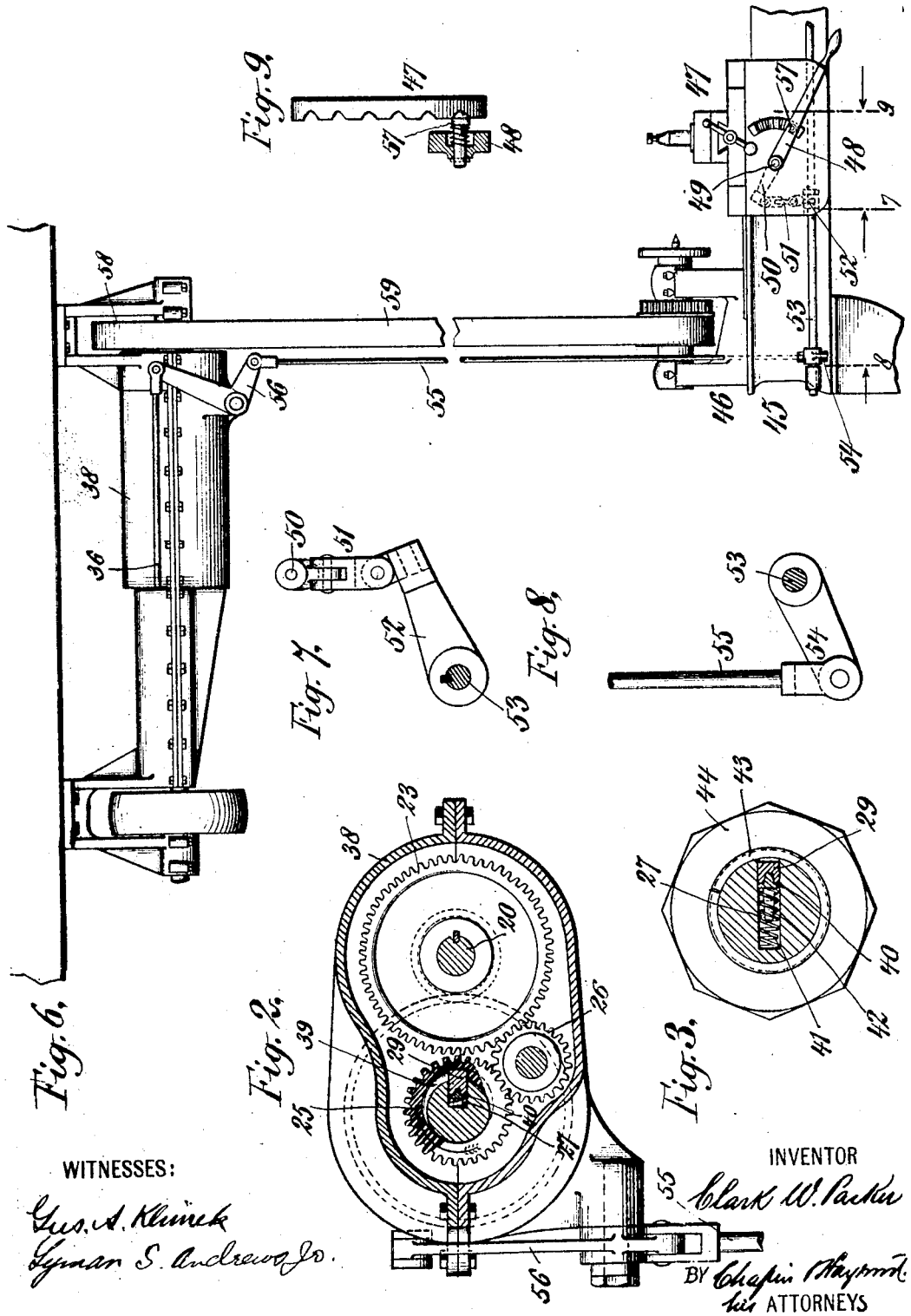

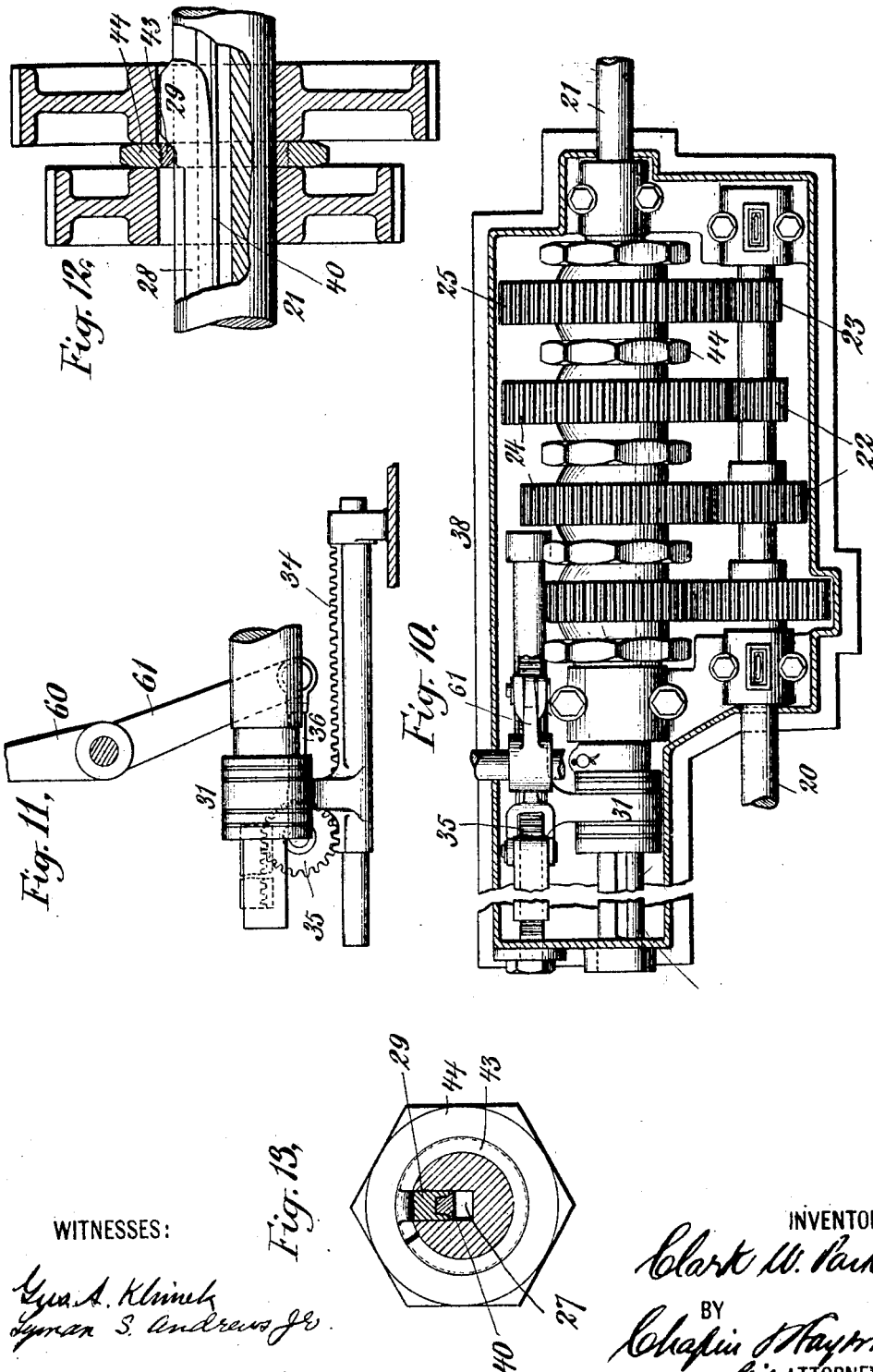

CLARK W. PARKER, OF SPRINGFIELD, MASSACHUSETTS, ASSIGNOR TO LAMB KNITTING MACHINE CO., OF CHICOPEE FALLS, MASSACHUSETTS, A CORPORATION OF MASSACHUSETTS.

TRANSMISSION-GEARING.

No. 876,083.  Specification of Letters Patent.  Patented Jan. 7, 1908.

Application filed March 16, 1907. Serial No. 362,693.

*To all whom it may concern:*

Be it known that I, CLARK W. PARKER, a citizen of the United States of America, and a resident of Springfield, county of Hampden, State of Massachusetts, have invented certain new and useful Improvements in Transmission-Gearing, of which the following is a specification, reference being had to the accompanying drawings, forming a part thereof.

My invention relates to improvements in transmission gearing, and particularly to transmission gearing involving change speed and reverse mechanism.

The main object of my invention is to provide a simple and efficient means for changing the speed of drive or reversing the direction of movement thereof while retaining the gearing employed in constant mesh; to so arrange that the transition from one speed to another may be as easy as possible and involve but a small movement of the operating parts; to simplify the operating mechanism and to strengthen and reinforce the parts whereby they will be able to withstand great shocks without liability to strain or breakage.

In order that my invention may be fully understood, I will now proceed to describe the same with reference to the accompanying drawings illustrating embodiments thereof, and will then point out the novel features in claims.

In the drawings: Figure 1 is a view in central longitudinal horizontal section through a change speed and reverse transmission mechanism embodying my invention. Fig. 2 is a transverse sectional view therethrough substantially upon the line 2—2 of Fig. 1. Fig. 3 is a detail transverse sectional view taken substantially upon the line 3—3 of Fig. 1. Fig. 4 is a detail sectional view taken substantially upon the line 4—4 of Fig. 1. Fig. 5 is a detail view in longitudinal section on an enlarged scale, showing a portion of a tapered ring and lock nut therefor employed at intervals along the driven shaft between the gears thereof. Fig. 6 is an assembly view in side elevation showing the transmission mechanism as employed in connection with a lathe and showing also the operating mechanism therefor. Figs. 7 and 8 are detail views at right angles to the point of view of Fig. 6, showing certain links, levers and connecting elements used in connection with the operating mechanism. Fig. 9 is a detail view illustrating an impositive lock employed in connection with the operating mechanism. Fig. 10 is a top view, with the casing in section, of an embodiment of my invention particularly designed to be employed in connection with automobile driving mechanism. Fig. 11 is a detail view in side elevation of certain parts thereof, including the operating mechanism. Fig. 12 is a detail view in partial side elevation and partial longitudinal section of a modified structure. Fig. 13 is a transverse sectional view of the same.

Considering first the transmission gearing itself regardless of its particular application, it will be seen that the same comprises a drive shaft 20, a driven shaft 21, a plurality of gears secured fast upon the drive shaft, a plurality of complementary gears in mesh therewith mounted loosely upon the driven shaft, and means for connecting any one of the said loosely mounted gears in driving relation with the driven shaft at will.

In the form of the apparatus shown in Fig. 1 there are five gear-wheels 22 of progressively different diameters as shown, mounted fast upon the drive shaft 20, and a sixth gear 23 also mounted fast upon the shaft, the said gear 23 being one of a set of reverse gears, that is to say, part of gearing which produces a reverse movement of the driven shaft with respect to the drive shaft to that which is produced by the other gearing. The driven shaft 21 has a set of five gear-wheels 24 complementary to the gear-wheels 22 and in constant mesh therewith, and also a gear-wheel 25 located upon the said driven shaft in the plane of rotation of the drive gear 23. The gear-wheels 23 and 25 are not in direct mesh with each other, however, being arranged in common mesh with an idler gear 26, as will be readily understood by reference to Fig. 2 of the drawings. This idler gear causes the driven gear 25 to be driven in a reverse direction to the direction in which the driven gears 24 are driven.

The driven shaft 21 has a key-way 27 to which is fitted a longitudinal key 28. The said key is fitted to slide freely in a longitudinal direction in said key-way, and is provided with a projecting portion or tooth 29 at one end thereof. At the other end the said key is pivotally connected as at 30 to a carrier 31, said carrier fitted upon the shaft 21 and arranged to slide freely thereon also in a longitudinal direction. The carrier 31 is caused to move lengthwise upon the shaft 21 by means of a slide 32 which has a portion arranged for engagement with the said carrier, said slide having a longitudinal bearing upon a slideway 33, and provided with rack teeth 34 which are arranged to intermesh with an operating pinion 35. The operating pinion 35 is carried by a bar 36, and also engages the teeth of a stationary rack 37 secured to the casing 38 of the device. Longitudinal movement of the bar 36 produces corresponding longitudinal movement, but at twice the speed, of the slide 32, and hence a similar movement of the carrier 31 and key 28. The projecting portion or tooth 29 of the key 28 is arranged for engagement with any one of key-ways or slots 39 with which each of the driven gears 24 and 25 are provided. In the embodiment of my invention shown in Figs. 1 to 11 inclusive the said key-way or slot 39 in the gear-wheels 24, 25 is substantially of the form shown in the transverse sectional view Fig. 2, that is to say, it has one substantially perpendicular wall which is adapted to be engaged by the side face of the projection or tooth 29 of the key 28, and to form an abrupt shoulder or abutment against which the same will bear when in driving relation, and an opposite wall oblique in direction forming a gradual rise from the circumferential bore of the wheel to the apex of the said slot or key-way 39. The only difference between the slot or key-way 39 for the driven gear 25 and for the other gears 24 is that the said slot or key-way 39 in the gear-wheel 25 will point in the opposite direction to that of the other said gears, owing to the fact that the direction in which the gear 25 is to be driven is opposite to that of the gears 24, as above set forth.

The inner face of the key 29 is channeled to receive a bar 40 through which yielding pressure in an outward direction is applied thereto. This yielding pressure is produced by means of springs 41 which are housed in recesses in the shaft 21 and engage the said bar 40, preferably surrounding lugs or projections 42 with which said bar is provided. The said bar 40 has no longitudinal movement with respect to the shaft, but in no way impedes longitudinal movement of the key 29 because of the fact that it is permitted to have a free relative sliding movement in the channel therein. The said bar will, however, transmit yielding pressure to the end of the key 28 carrying the tooth or projection 29 in whatever position it may be. The relative shape of the tooth or projection 29 and the key-ways or slots 39 is such as to permit longitudinal movement of the key 28, the end 29 being forced downward by the cam-like action between the said tooth or projection 29 and the curved top faces of the key-ways or slots 39, against the yielding pressure of the spring or springs 41 as the key is thus moved longitudinally. Thus the key may be caused to engage the hubs of any one of the wheels 24, 25 at will, by a mere longitudinal movement of the carrier 31, such movement producing automatically both longitudinal and lateral (radial) movements of the part 29. It will also be noticed that the gears are arranged progressively in their speed relations toward each other, the drive at the highest speed being the farthest away from the reverse, and that at the lowest speed being nearest the reverse. For many purposes this is a great convenience, as it enables the drive to be gradually slowed down to a movement at very slow speed, and then reversed from this point to whatever speed the reverse gearing may have. The form of the slots or key-ways 39 is of great convenience and importance, as it not only enables the key to readily engage any one of the gears positively, and to move without fail into complete engagement therewith, but also it permits overrunning of the parts operating at such time, in the same way as a ratchet and pawl construction to which, indeed, it bears close resemblance.

Because of the necessity of the deep key-way 27 in the shaft 21, which, it will be seen, partially severs the shaft and hence tends to weaken it, I have provided means at different points for reinforcing the said shaft, such means comprising split rings 43 arranged one between each pair of driven gears, such rings having tapered peripheries which are provided with screw threads and to which are fitted nuts 44. The tapered split rings 43 are fitted to the shaft somewhat accurately and are then screwed tightly into place by means of the correspondingly tapered nuts 44, such means forming strong reinforcements for the shaft 21 and positively preventing any spreading of the same. This reinforcing means is preferably made in removable form as described, to permit the entire structure to be readily taken to pieces, so as to allow access to be had to the shaft when desired. It will be readily understood that if the reinforcing devices were fast upon the shaft it would not be possible to remove the gears once they were in position. The said rings and nuts also form convenient spacing devices or shoulders to maintain the loose gears 24, 25 in their proper relative positions upon the shaft 21.

The foregoing transmission device is particularly adapted for use in connection with lathes, thereby entirely doing away with the usual cone pulleys, clutch, and reverse belting usually employed. Where employing the device in this connection I conveniently provide an operating handle or lever arranged to be carried upon the apron of the tool carriage. As the operator usually follows the carriage so as to be opposite the point at which the tool is working, the convenience of this will be readily seen. This mechanism will be understood by reference to Figs. 6, 7 and 8 of the drawings, in which 45 designates a lathe, 46 the head stock thereof, and 47 the carriage. An operating lever 48 is pivotally mounted at 49 upon the apron of the carriage 47, the pivot 49 of the said lever carrying an arm 50 which is connected by means of a link connection 51 with an arm 52, which has a splined connection with a longitudinal shaft 53. The arm 52 is arranged to travel longitudinally with the carriage, being permitted to do so by reason of its splined connection with the shaft 53, said splined connection enforcing, however, corresponding rotative movement of the said arm and shaft. Near one of its ends the said shaft is provided with an arm 54 rigidly secured thereto, said arm 54 connected by means of a link 55 with one arm of a bell crank lever 56, the other arm of the said bell crank lever being connected with the aforesaid bar 36. From the foregoing it will be readily understood how movements of the operating lever 48 will be transmitted to the operating bar 36 in whatever position the carriage 47 may be along the lathe 45. I have provided an impositive block 47 between the operating lever 48 and the slide rest 47, whereby the operating lever may be readily brought to rest at points corresponding to the points at which the tooth or projection 29 of the key 28 engages any one of the driven gears. The driven shaft 21 is provided with a pulley 58, by which movement is transmitted through a belt 59 to a corresponding pulley upon the head stock of the lathe. The drive shaft 20 is driven by means of a belt and pulley connection or in any other suitable way as may be desired. The convenience of this mechanism when thus employed in lathe work will be readily understood. The operator has complete control of the speed at which the work may be driven, and that without leaving his place opposite the point at which the work is actually being done. Not only this, but he can reverse at will, and the reverse, coming as it does next to the slowest speed, enables him to closely watch screw cutting work and to accurately reverse at the last minute, as is most desirable.

When employing the mechanism in connection with automobiles, it is not necessary to have as many speeds as when employing the same for other classes of machinery such as lathes, while on the other hand, the mechanism should be somewhat stronger. In Figs. 10 and 11 I have shown a convenient form of the device, especially adapted for automobile work. In this form I have shown three speeds forward and one reverse, and have provided an operating lever 60 provided with an arm 61 which directly connects with the operating bar 36.

In Figs. 12 and 13 I have shown a modification in which the slot or key-way in the gear-wheels is of uniform size and shape throughout. In this form there is no ratchet and pawl like connection, as will be understood by reference to Fig. 13, and the cam action by which the key is forced downward to compel it to leave one wheel and permit it to engage with another is produced by permitting the said key to engage the inner edge of the tapered ring between the gears.

What I claim is:

1. In mechanism of the class described, the combination with a drive shaft and a driven shaft, of a plurality of gears mounted fast upon one of the said shafts, a plurality of gears for co-action therewith mounted loosely upon the other said shaft, a sliding key mounted in said latter shaft, said shaft provided with a key-way for receiving the same, and reinforcing means secured fast upon the said shaft between the gear-wheels thereon.

2. In mechanism of the class described, the combination with a shaft having a key-way therein, a sliding key fitted to the said shaft, and rotatable members mounted upon said shaft and with which said key is adapted to engage, of reinforcing means for the shaft comprising a ring secured under pressure to the said shaft.

3. In mechanism of the class described, the combination with a shaft having a key-way therein, a sliding key fitted to the said shaft, and rotatable members mounted upon said shaft and with which said key is adapted to engage, of reinforcing means for the shaft comprising split rings, and means for clamping them fast upon the shaft.

4. In mechanism of the class described, the combination with a shaft having a key-way therein, a sliding key fitted to the said shaft, and rotatable members mounted upon said shaft and with which said key is adapted to engage, of reinforcing means for the shaft comprising tapered split rings, and means for clamping them upon the shaft.

5. In mechanism of the class described, the combination with a shaft having a key-way therein, a sliding key fitted to the said shaft, and rotatable members mounted upon said shaft and with which said key is adapted to engage, of reinforcing means for the shaft comprising exteriorly screw threaded tapered split rings, and nuts fitted thereto for clamping them upon the shaft.

6. In mechanism of the class described, the combination with a shaft and gear-wheels mounted loosely thereon, said shaft provided with a longitudinal key-way, of a longitudinally movable key mounted in said key-way and provided with a projection adapted to engage any one of the said gears, a bar engaging the under side of said key, springs forcing the said bar outwardly, and means for moving the said key longitudinally.

7. In mechanism of the class described, the combination with a shaft and gear-wheels mounted loosely thereon, said shaft provided with a longitudinal key-way, of a longitudinally movable key mounted in said key-way, said key being longitudinally channeled, a bar fitted to the longitudinal channel of said key, springs bearing with yielding pressure against said bar to force the same outwardly, and means for moving said key longitudinally.

CLARK W. PARKER.

Witnesses:
 ERNEST W. SEAHOLM,
 IRVING R. LYON.